Figure 1:
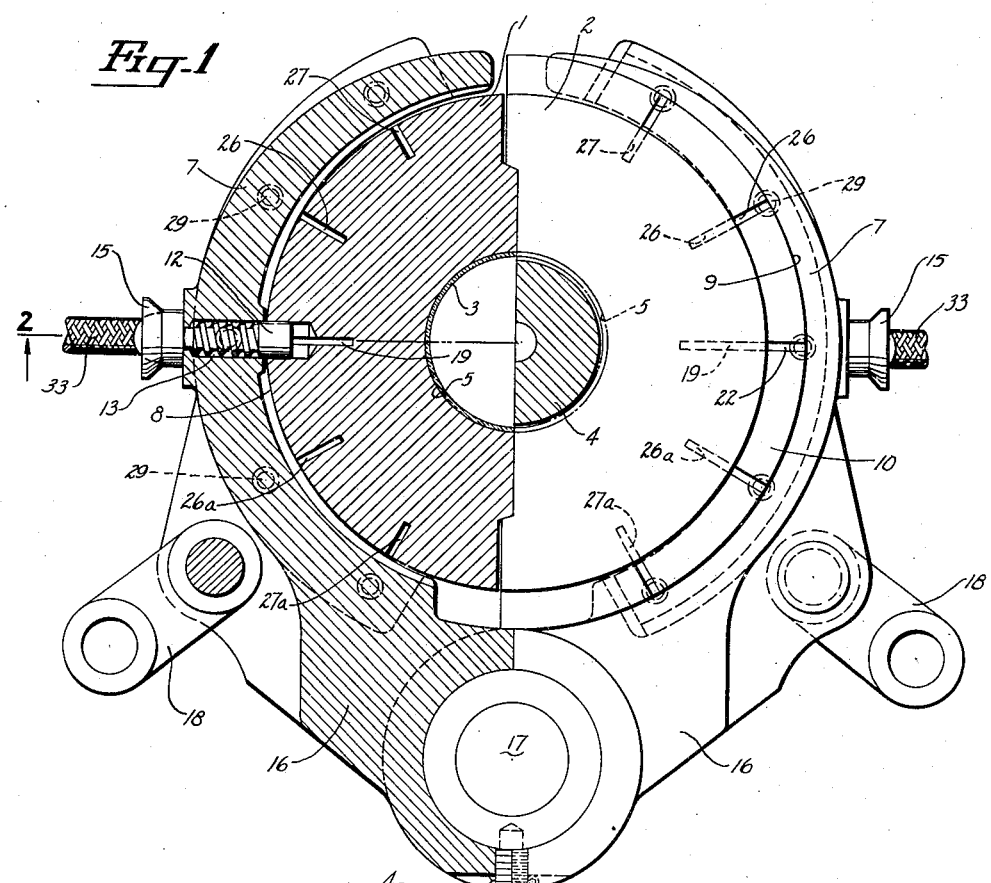

Oct. 25, 1949.  H. C. MacCONNELL, JR  2,485,836
GLASSWARE MOLD COOLING MEANS
Filed Sept. 10, 1947

INVENTOR
HUGH C. MacCONNELL, JR.
BY Parham & Bates
ATTORNEYS

Patented Oct. 25, 1949

2,485,836

UNITED STATES PATENT OFFICE 2,485,836

GLASSWARE MOLD COOLING MEANS

Hugh C. MacConnell, Jr., West Hartford, Conn., assignor to Hartford-Empire Company, Hartford, Conn., a corporation of Delaware Application September 10, 1947, Serial No. 773,183

5 Claims. (Cl. 49—68)

This invention relates to improvements in means for cooling the molds of glassware forming machines.

The thermal condition of a mold in which articles of glassware, such as bottles, are being formed is an important factor in the efficiency of production of such articles. If the mold is too cold, the surface of the glassware produced will have ripples, waves or like defects. On the other hand, if the mold is too hot, the glass will stick thereto, thus interfering with the glassware forming operation. It is believed to be desirable to have the mold cavity at a temperature which is just below that which would cause any sticking thereto of the hot glass in the mold and which is substantially even throughout the surface of the mold cavity while the mold is in operation.

The mold, when in use, extracts considerable heat from the hot glass therein, particularly in modern practice in which emphasis is quite often placed on a relatively high mold rate, i. e., a relatively high rate of production of articles of glassware by a given mold in a unit of time. Therefore, it ordinarily is necessary to cool the mold artificially or by forced cooling as distinguished from natural cooling from the surrounding atmosphere. In the case of a blow mold, the heat extracted from a glass parison must be sufficient in the mold contact time available at the mold rate attempted to set the formed article up sufficiently so that it will be substantially form retaining for at least the time required for it to be taken out of the mold and delivered to an adjacent article receiver or receiving surface, where it may receive further cooling.

Various means for and methods of cooling molds have been provided prior to the present invention. All of these, of which I have any knowledge, have some shortcomings or features of disadvantage. In general, they do not adequately provide for requisite differential cooling of different portions of a mold so as to produce an even temperature of the desired degree all over the surface of the mold cavity. Some have the fault of causing rapid and uneven temperature changes in portions of the mold cavity because of impingement thereagainst of some of the cooling air employed or impairment of the glassware being produced because of the contact of the cooling air with the glass during its transfer to the mold.

An object of the present invention is to effect better cooling of a glassware mold than is accomplished by the prior mold cooling means and methods referred to.

A more specific object of the invention is to provide a means of a dependable character and relatively simple construction for cooling a mold by use of a cooling fluid, such as air under pressure, so that different portions of the mold will be thermally conditioned to extract heat from different portions of the glass in contact with the wall of the mold of the cavity as required during the available time of mold contact and to maintain the wall of the mold cavity uniformly at the temperature desired.

A further object of the invention is to effect cooling of the mold in the improved manner and with the improved results above described without permitting any part of the cooling fluid to impinge against any portion of the mold cavity or against the glass supplied to the mold or formed therein.

Another object of the invention is to provide a mold cooling means for effecting improved cooling of a mold as above described by an operation which requires but relatively little cooling fluid.

Figure 2:
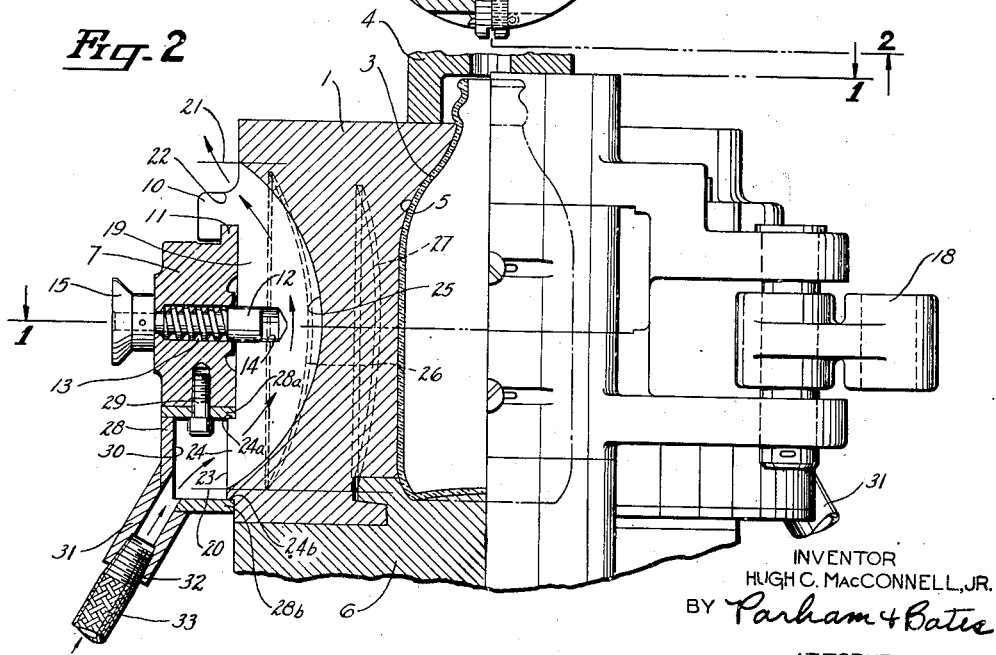

Other objects and advantages of the invention hereinafter will be pointed out or will be obvious from the following description of a practical embodiment of the invention as shown in the accmpanying drawings, in which:

Fig. 1 is a view, partly in plan and partly in horizontal section, of a mold equipped with the novel mold cooling means, the view being approximately along the line 1—1 of Fig. 2; and Fig. 2 is a view, partly in elevation and partly in vertical section, of the mold and cooling means, the view being approximately along the line 2—2 of Fig. 1.

A mold to which the present invention is applied is shown in the drawings as being a blow mold of a conventional split type, comprising a body comprising two cooperating approximately half sections, designated 1 and 2, respectively. This particular mold, which may be made of cast iron or of any other suitable material, is adapted for the formation therein of a glass parison (not shown) into an article of glassware, specifically a bottle designated 3 in Fig. 2, of a so-called "round" type. That is, the formed article, which is produced by expansion of the glass of the parison against the wall of the mold cavity by blowing air supplied to the interior of the parison through a blow head 4, is of approximately circular configuration at any level from its bottom throughout its height or at least for a major portion thereof. The sections 1 and 2 of the mold therefore have their internal or cavity forming walls, indicated at 5, appropriately shaped to give the desired external shape to the formed article of glassware. A bottom plate, indicated at 6 in Fig. 2, is operatively associated with the sections of the split mold for formation of such an article of glassware.

For supporting and opening and closing the mold sections, pivotally mounted mold section holders 7 are provided. The outer surfaces of the mold sections 1 and 2, designated 8 and 9, respectively, are substantially circular in configuration at any level between their upper and lower ends and the mold section holders 7 therefore are semi-annular, being appropriately formed closely to embrace vertically intermediate portions of the mold sections. These mold sections may be attached to their holders in any suitable known way and by any suitable known means. As shown, the mold sections have similar outwardly and downwardly extending or angular integral attaching lugs on their exteriors, as indicated at 10, these attaching lugs being located well above the horizontal median line of the mold section in position to overlie and engage with upstanding flanges or ribs 11 on the holders 7. The lugs 10 on the mold sections and the upturned ribs 11 on the holders for the mold sections may be coextensive angularly with the parts on which they are formed and are of at least sufficient angular extent to afford stable support for the mold sections when they are mounted on their holders, although a slight floating movement of a mold section in its holder is possible. Each mold section holder may be provided with a spring-pressed latching detent or plunger 12 which normally projects from a socket or recess 13 in which it is slideably disposed into a radially aligned socket or recess 14 in the mold section in that holder, substantially as shown in Fig. 2, whereby to cooperate with the lug 10 and the rib 11 on the mold section and holder, respectively, to prevent accidental dislodgement or displacement of the mold section from its holder. Each latching plunger or detent 12 has an operating handle or knob 15 which may be grasped and pulled outward against the action of the spring of the latching device to permit detachment of the mold section from its holder when desired.

The mold section holders 7 are shown as being integral portions of arms 16 which are pivotally mounted on a fixed vertical shaft 17. Suitable operating means (not shown) are attached to these arms, as by use of the links 18, for swinging the pivoted arms and the parts carried thereby about the axis of the vertical shaft 17 to effect opening and closing of the mold sections at proper times.

The particular mold, the holders for its sections, the means for detachably securing the sections to their holders, the pivoted arms of which the holders are integral parts, and operating means as referred to all may be substantially as included in the Hartford I. S. forming machine, these parts as shown in the drawings and as so far specifically described or referred to herein being substantially as shown and described in Ingle Patent 1,911,119 of May 23, 1933. Since these parts, per se, do not form part of the present invention, they may have any other suitable known construction.

In carrying out the present invention for cooling a mold comprising cooperative sections 1 and 2, each of these sections is provided with a plurality of vertically extending cooling conduits which may have inlets and outlets opening through the outer wall of the mold section respectively well below and well above the horizontal median line of that section, as respectively below and above its holder 7. These cooling conduits may differ individually according to the cooling effects which they individually are to have on different portions of the mold sections. The number of individual cooling conduits and their relative positions and spacing may all be predetermined according to cooling requirements. As shown, the mold section 1 is provided with cooling conduits which will be specifically described and this description will serve also for like conduits in the mold section 2, the same reference characters being applied to like parts.

Mold section 1 is provided with a cooling conduit comprising a vertical slot 19 milled in the outer surface of the section 1 intermediate its side edges, this slot extending from a level, indicated at 20, not far above the bottom of the mold section to a level, indicated at 21, above the portion of the mold section that is provided with the attaching lug 10 and not far below the top of the mold section. The slot 19 thus opens at its upper end through the portion of the section provided with the lug 10 and above the section holder 7, this being an outlet, designated 22, of such slot. An inlet of the slot, designated 23, is provided in a portion of the mold section 1 that is located below the holder 7. This portion of the mold section may be formed with an integral, horizontally extending, bar-like boss 24 thereon for a purpose presently to be stated. The slot 19 is milled to increase regularly in depth or radial extent from its upper and lower ends to a level intermediate its height, at which it is deepest and closest to the mold cavity. Its bottom wall, indicated at 25, thus is curved arcuately from its upper to its lower end. Cooling fluid directed into the slot 19 through its inlet 23 thus will extend to an increasingly greater depth into the mold section toward the mold cavity as it passes upwardly around the lower half portion of the mold section holder and then to a decreasing depth as it passes upwardly around the remaining half portion of the holder to the outlet 22 at the upper end of the slot. The slot is of course covered at its outer side between its inlet and its outlet by the holder 7. Above the holder 7, the curved bottom wall 25 of the slot will direct the cooling fluid outwardly through the outlet 22 away from the mold cavity and from any glass which may be in process of transfer to the space between the mold sections when such sections are open.

The slot 19 is one of a plurality of slots in the mold section 1, being flanked on one side in the example shown by slots 26 and 27, respectively, and on the opposite side by slots 26a and 27a, respectively. The angular spacing between these slots is uniform in the example shown but it may be varied. The slots 26 and 26a are alike and each is more shallow than the slot 19. The slots 27 and 27a are alike and each is more shallow than the slots 26 and 26a. All of these slots have inlets and outlets at their lower and upper ends, opening through the outer surface of the mold section 1 respectively below and above the covering mold section holder 7 substantially as described for the slot 19. Each has a curved bottom wall for directing fluid from its outlet away from the mold section. As indicated by Fig. 2, the slots 26 and 26a may be milled to terminate at their upper ends slightly below the level of the upper end of the slot 19 and the slots 27 and 27a at a still slightly lower level. These levels may of course be varied within limits as deemed best for particular conditions.

In the example shown, the inlets of all the vertical slots in the mold section 1 are supplied with a cooling fluid under pressure by an intake manifold 28. This is in the form of a horizontally disposed, arcuately curved channel having its open side next to the outer surface of the mold section below the holder 7, the channel being of sufficient width, i. e., vertical extent, that the legs 28a and 28b thereof, respectively, fit over and above the top and bottom surfaces 24a and 24b, respectively, of the boss 24 on the mold section. The upper leg 28a of the manifold then bears flatwise against the bottom face of the holder 7 and is secured to the latter by suitable fastening means, such as the cap screws 29. This arrangement locates the fluid supply chamber, designated 30, of the manifold in communication with the lower, intake ends of all the vertical slots in the mold section without preventing the slight "float" of the mold section in its holder. The manifold 28 is provided with an inlet which may comprise a nipple 31 extending downwardly from the lower corner portion of such manifold approximately intermediate its length, this nipple being connected as at 32, Fig. 2, to a flexible tube 33 by which compressed air or any other suitable cooling fluid under pressure may be supplied to the chamber or space 30 within the manifold and thence to the lower, intake ends of the several slots.

The cooling provisions thus described as applied to the mold section 1 are duplicated for the mold section 2.

Cooling of the mold according to the present invention by the means described will remove heat from different portions of the mold to different extents as has been predetermined to be necessary when the mold is in use to maintain a desirable temperature substantially uniform throughout the surface of the mold cavity when a predetermined number of glass articles are being formed satisfactorily in the mold in a given time. It is to be understood that the relative arrangement, number and specific depths and hence cooling effects of the individual slots may be different for different molds and for like molds which are to be used to meet different operating requirements or under different service conditions. While the invention has been illustrated and described as applied to a blow mold in which an article of glassware is given the final shape desired, the principle of the invention may also be applied to other molds, such as parison and blank molds in which articles are given a preliminary shape or are only partially formed.

I do not wish to be limited to the details of the illustrative embodiment of the invention shown in the drawings and herein particularly described as many modifications thereof and changes therein will now be obvious or will readily occur to those skilled in the art.

I claim:

1. A glassware mold comprising a body formed to provide a central cavity therein and having a plurality of angularly spaced substantially vertical slots formed in the material of the mold body from its outer surface toward the central cavity therein, each of said slots increasing in depth from its lower end for approximately half its height and decreasing in depth for the remainder of its height, means to cover said slots at the outer surface of the mold for a substantial part of their height, leaving the extreme upper and lower portions of the slots open at the outer surface of the mold, means to supply cooling fluid under pressure to said slots at one end thereof.

2. A glassware mold as defined by claim 1 wherein certain of said slots are deeper in the material of said mold body than other of said slots.

3. A glassware mold as defined by claim 1 wherein certain of said slots are of greater vertical extent in the material of said mold body than other of said slots.

4. A glassware mold comprising a body comprising a pair of openable and closable vertically disposed approximately half sections and pivoted substantially horizontal holders embracing said sections intermediate their upper and lower ends so that the outer surfaces of said sections extend vertically both above and below said holders, said sections having angularly spaced vertical slots in the outer surfaces of the sections from a level below to a level above said holders so that said slots are covered between their extreme upper and lower end portions, and pressure fluid manifolds positioned below said holders and fastened thereto in positions to cover the portions of the mold body sections containing the lower end portions of said slots, said manifolds having an internal chamber for pressure fluid in communication with the lower end portions of said slots.

5. A glassware mold as defined by claim 4 wherein the upper end portions of said slots are formed to direct outwardly from the mold body sections fluid passing outwardly therethrough.

HUGH C. MacCONNELL, Jr.

REFERENCES CITED

The following references are of record in the file of this patent:

UNITED STATES PATENTS

| Number | Name | Date |
| --- | --- | --- |
| 1,523,021 | Ladd | Jan. 13, 1925 |
| 1,531,415 | Said | Mar. 31, 1925 |
| 1,632,992 | Bragg | June 21, 1927 |
| 1,633,028 | La France | June 21, 1927 |
| 1,685,546 | Lee | Sept. 25, 1928 |